(12) United States Patent
Revelis et al.

(10) Patent No.: US 8,528,705 B2
(45) Date of Patent: Sep. 10, 2013

(54) BRAKE ACTUATOR WITH IMPROVED EFFICIENCY

(75) Inventors: Peter Revelis, Newmarket (CA); Mark Van Ryswyck, Concord (CA); Jaafar Bashiry-Khoshraftar, Richmond Hill (CA)

(73) Assignee: Ventra Group, Inc., Bradford (CA)

( * ) Notice: Subject to any disclaimer, the term of this patent is extended or adjusted under 35 U.S.C. 154(b) by 339 days.

(21) Appl. No.: 12/898,354

(22) Filed: Oct. 5, 2010

(65) Prior Publication Data

US 2011/0079473 A1    Apr. 7, 2011

Related U.S. Application Data

(60) Provisional application No. 61/248,675, filed on Oct. 5, 2009.

(51) Int. Cl.
*F16D 65/14* (2006.01)

(52) U.S. Cl.
USPC ............ 188/2 D; 188/196 M; 74/528; 74/545

(58) Field of Classification Search
USPC ....... 188/2 D, 196 M; 74/528–548, 575–578
See application file for complete search history.

(56) References Cited

U.S. PATENT DOCUMENTS

| | | | | |
|---|---|---|---|---|
| 3,861,237 A | * | 1/1975 | Mounts | 74/516 |
| 4,872,368 A | * | 10/1989 | Porter | 74/542 |
| 5,182,963 A | * | 2/1993 | Perisho et al. | 74/512 |
| 5,309,786 A | * | 5/1994 | Pare et al. | 74/512 |
| 5,385,068 A | * | 1/1995 | White et al. | 74/512 |
| 5,533,420 A | * | 7/1996 | Perisho | 74/512 |
| 6,202,980 B1 | | 3/2001 | Vincent et al. | |
| 6,282,980 B1 | * | 9/2001 | Sykes | 74/528 |
| 6,286,389 B1 | | 9/2001 | Papadatos | |
| 6,397,468 B2 | | 6/2002 | Popowich | |
| 6,513,632 B2 | * | 2/2003 | Peter | 188/162 |
| 6,718,836 B2 | | 4/2004 | Revelis et al. | |
| 7,475,615 B2 | * | 1/2009 | Revelis | 74/523 |
| 7,650,815 B2 | * | 1/2010 | Revelis et al. | 74/526 |
| 8,096,389 B2 | * | 1/2012 | Herman et al. | 188/2 D |
| 2006/0272445 A1 | * | 12/2006 | Wortmann | 74/560 |
| 2009/0101455 A1 | * | 4/2009 | Eckerle et al. | 188/79.54 |

* cited by examiner

*Primary Examiner* — Robert A Siconolfi
*Assistant Examiner* — Mariano Sy
(74) *Attorney, Agent, or Firm* — Pillsbury Winthrop Shaw Pittman LLP

(57) ABSTRACT

A brake actuator for use in a motor vehicle having brakes actuable by a cable system with cables. The brake actuator includes a mounting bracket and an output member connected to the cables. The brake actuator includes an input lever mounted to the mounting bracket at a pivot for movement in brake applying and brake releasing directions. The pivot of the input lever is spaced axially from the output member and connected to the output member to effect movement of the output member. A plate is provided between the mounting bracket and the input lever and prevents contact between the mounting bracket and the input lever during movement between the brake applying and releasing directions. An additional plate is provided between the mounting bracket and a cover portion and prevents contact between the mounting bracket and the cover portion during movement between the brake applying and brake releasing directions.

17 Claims, 7 Drawing Sheets

BRAKE ACTUATOR WITH IMPROVED EFFICIENCY

CROSS-REFERENCE TO RELATED APPLICATIONS

The present application claims the benefit of priority from U.S. Provisional Patent Application No. 61/248,675, filed on Oct. 5, 2009, the content of which is incorporated herein by reference in its entirety.

FIELD OF THE INVENTION

The present invention relates to a brake actuator with a plate for improving the efficiency thereof.

SUMMARY OF THE INVENTION

The present invention provides for an improvement to a brake actuator for use in a motor vehicle having one or more vehicle brakes actuable by a cable system with one or more cables. The brake actuator includes a mounting bracket and an output member constructed to be operatively connected to the one or more cables. The brake actuator also includes an input lever movably mounted to the mounting bracket at a pivot point for movement in brake applying and brake releasing directions. The pivot point of the input lever is spaced axially from the output member and operatively connected to the output member to effect movement of the output member. A plate is provided between the mounting bracket and the input lever. The plate is constructed to prevent direct contact between the mounting bracket and the input lever during movement between the brake applying and brake releasing directions.

Another aspect of the invention provides a motor vehicle comprising one or more vehicle brakes having a cable system comprising one or more cables for actuating the one or more vehicle brakes. The motor vehicle also includes a mounting bracket and an output member constructed to be operatively connected to the one or more cables. The motor vehicle also includes an input lever movably mounted to the mounting bracket at a pivot point for movement in brake applying and brake releasing directions. The pivot point of the input lever is spaced axially from the output member and operatively connected to the output member to effect movement of the output member. A plate is provided between the mounting bracket and the input lever. The plate is constructed to prevent direct contact between the mounting bracket and the input lever during movement between the brake applying and brake releasing directions.

Another aspect of the invention provides a brake actuator for use in a motor vehicle having one or more vehicle brakes actuable by a cable system with one or more cables. The brake actuator includes a mounting bracket and an output member constructed to be operatively connected to the one or more cables. The brake actuator also includes an input lever movably mounted to the mounting bracket at a pivot point for movement in brake applying and brake releasing directions. The pivot point of the input lever is spaced axially from the output member and is operatively connected to the output member to effect movement of the output member. A cover portion is operatively connected to the input lever with the mounting bracket disposed between the input lever and the cover portion. The cover portion is constructed and arranged to move with the input lever when the lever is moved between the brake applying and brake releasing positions. The brake actuator also includes a plate provided between the mounting bracket and the cover portion. The plate is constructed and arranged to prevent direct contact between the mounting bracket and the cover portion during movement between the brake applying and brake releasing directions.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein can be considered drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

DETAILED DESCRIPTION OF ILLUSTRATED EMBODIMENT OF THE INVENTION

Figure 1:
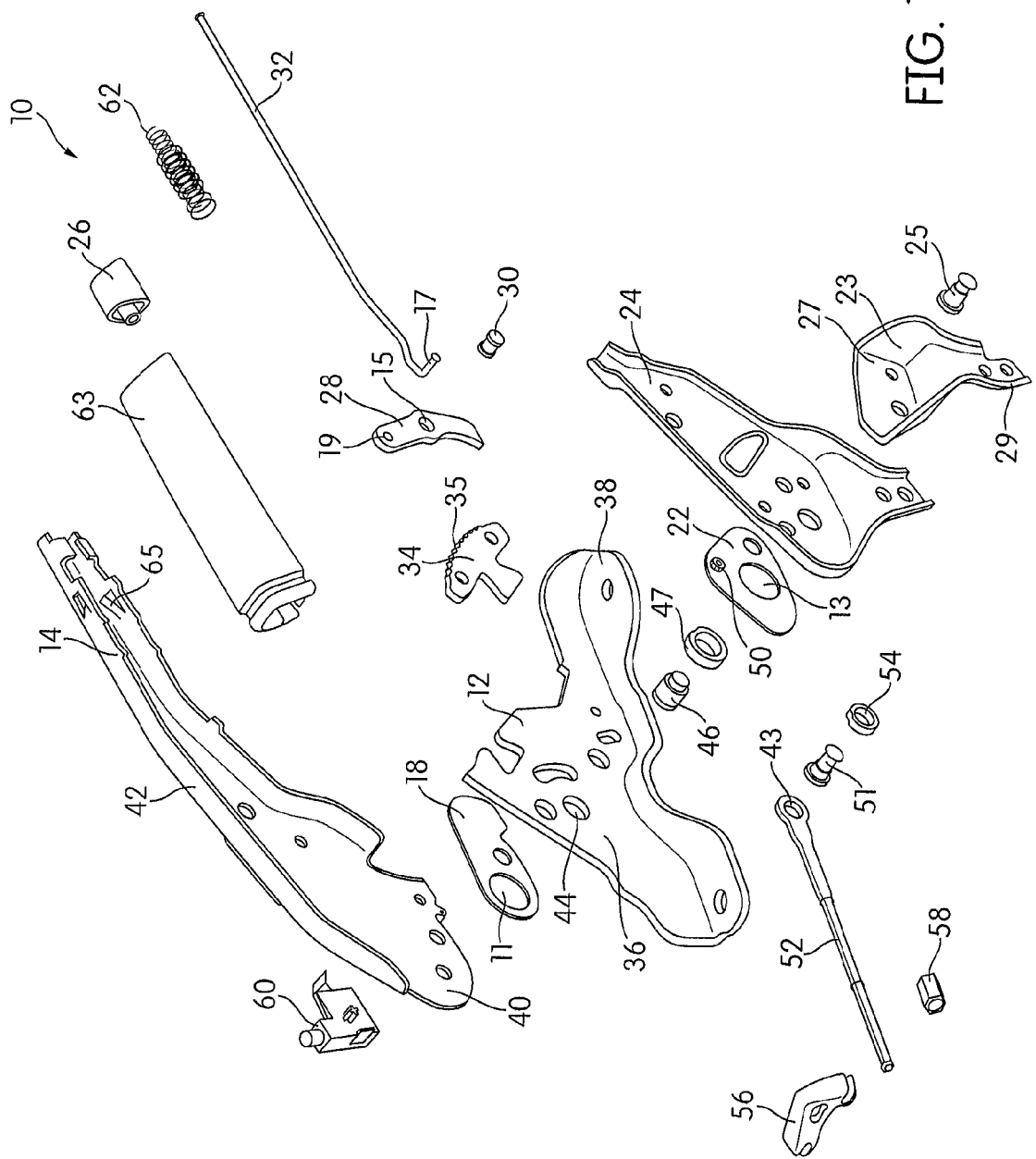
FIG. 1 is an exploded perspective view of the brake actuator.
Figure 7:
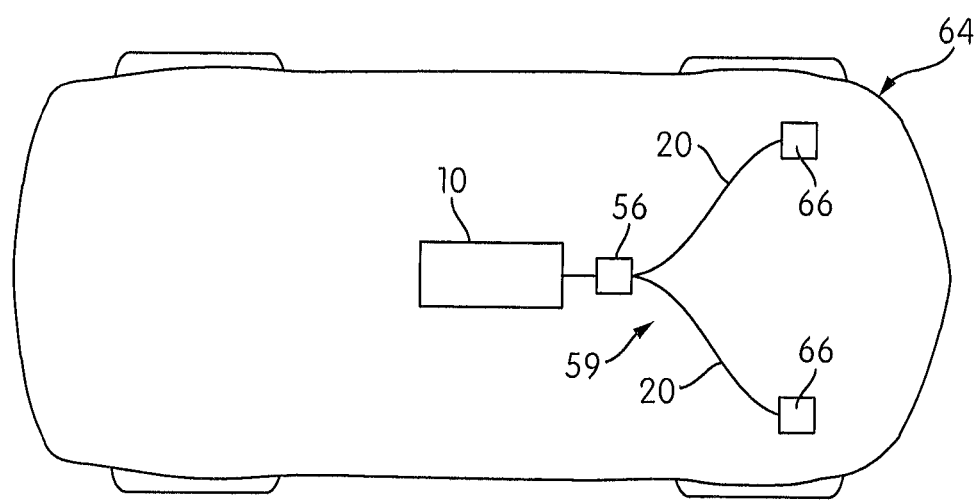
FIG. 7 is a schematic of the brake actuator in a motor vehicle.

The figures illustrate a brake actuator 10 constructed to activate the braking mechanism 66 on a motor vehicle 64 (see FIG. 7). In FIG. 1, the brake actuator 10 has a mounting bracket 12 that is capable of being affixed to the interior floor of a motor vehicle 64 (see FIG. 7). The mounting bracket 12 has a horizontal bottom section 38 in contact with the floor of the motor vehicle 64 and a vertical section 36. Both the horizontal side section 38 and the vertical section 36 are provided with a plurality of holes.

The brake actuator 10 has an input or actuator lever 14 rotatably attached to the mounting bracket 12 at a pivot point 44 (defined by a pivot pin or rivet 46 or other suitable structure for establishing a pivotal connection). In one embodiment, a bushing 47 may be provided between the rivet 46 and the mounting bracket 12 so as to reduce the wear between the rivet 46 and the mounting bracket 12 and to constrict and restrain the lateral movement of the rivet 46. Specifically, the bushing 47 is received in the pivot opening at the pivot point 44 in the vertical section 36 of the mounting bracket 12, and the rivet 46 is pivotally received in the bushing 47.

The brake actuator 10 also has a cover 24 rotatably attached to the mounting bracket 12 at the pivot point 44, defined by the rivet 46. The cover 24 is attached to the actuator lever 14 such that the cover 24 moves along with the actuator lever 14 when the actuator lever 14 is moved between an applied or engaged position wherein brake mechanism 66 is actuated and a released position wherein brake mechanism 66 is de-actuated.

The actuator lever 14 has a lower side section 40 and an upper section 42. The lower side section 40 is provided with a plurality of holes, and is connected to the vertical side section 36 of mounting bracket 12 at the pivot point 44. Actuator lever 14 is also provided with spring shoulders 65 which are configured to be engaged by the inner end of spring 62 (discussed below). A molded plastic hand grip 63 is molded on the distal free end thereof. The hand grip 63 may optionally be made of rubber or other anti-slip material. Mounting bracket 12 and actuator lever 14 can be made from any number of suitable materials, including metal, plastic, strong rubber, composite materials, or any combination thereof.

A first wear plate 18 may be provided between the actuator lever 14 and the vertical side section 36 of the mounting bracket 12. The first wear plate 18 may be pivotally attached to the mounting bracket 12 at the pivot point 44 by the rivet 46. A plurality of holes may be provided on the first wear plate 18 to attach the actuator lever 14 thereto and to enable the first wear plate 18 to pivot with respect to the mounting bracket 12 along with the movement of the actuator lever 14. A second wear plate 22 may be provided between the mounting bracket 12 and the cover 24. The second wear plate may be pivotally attached to the mounting bracket 12 at the pivot point 44 by the rivet 46. A plurality of holes may be provided on the second wear plate 22 to attach the cover 24 thereto and to enable the second wear plate 22 to pivot with respect to the mounting bracket 12 along with the cover 24 (which also moves with the actuator lever 14). As shown in FIG. 1, a hole 11 may be provided on the first wear plate 18 that may be constructed and arranged to receive the rivet 46. Similarly, as shown in FIG. 1, a hole 13 may be provided on the second wear plate 22 that may be constructed and arranged to receive the rivet 46.

The first wear plate 18 and the second wear plate 22 may be attached to the actuator lever 14 and the cover 24, respectively, using an attachment structure. The attachment structure may be a snap structure 50, which is inserted into a hole disposed on the cover 24 and on the lower wall 40 of actuator lever 14. Although snap structure 50 is only shown on the second wear plate 22 in FIG. 1, there may also be a similar snap structure 50 on the first wear plate 18. The snap structures 50 ensures that the first wear plate 18 remains affixed to the actuator lever 14 and that the second wear plate 22 remains affixed to the cover 24. This enables the first wear plate 18 and the second wear plate 22 to move with the actuator lever 14 and the cover 24 when they are pivoted between the applied and released positions.

Although the first wear plate 18 and the second wear plate 22 may be affixed to actuator lever 14 and the cover 24, respectively, by snap structures 50 as described above, other methods of attaching the first wear plate 18 and the second wear plate 22 to actuator lever 14 and the cover 24, respectively, may be employed. For example, the first wear plate 18 and the second wear plate 22 may be riveted to actuator lever 14 and the cover 24, respectively. The first wear plate 18 and the second wear plate 22 may be press fit into actuator lever 14 and the cover 24, respectively, or adhesive bonding may be used. Pins, screws, or other attachment mechanisms may optionally be used. For example, in one embodiment, the first wear plate 18 and/or the second wear plate 22 may be attached to the actuator lever 14 and the cover 24, respectively, via overmolding. In such an embodiment, the plastic material of the wear plates 18, 22 may be injection molded over the metal material of the actuator lever 14 and the cover 24. Although exemplary methods of attachment are provided above, it can be appreciated by one skilled in the art that any attachment method is contemplated by the inventors, and this disclosure is in no way intended to limit the scope of the invention. Also, these variations (and any other variations) could be implemented in a construction where the first wear plate 18 and the second wear plate 22 are provided on the mounting bracket 12. In other variations, the wear plates 18, 22 may be pivotally fixed to the vertical section 36 of the mounting bracket 12, as opposed to pivoting with the lever 14 and cover 24.

The first wear plate 18 and the second wear plate 22 may be made of plastic, which will reduce the wear that typically results from metal-to-metal contact between the actuator lever 14 and the mounting bracket and the actuator lever 14 and the cover 24. However, the first wear plate 18 and the second wear plate 22 may also be made from any suitable materials, including spring steel or other metal, strong rubber, composite materials, or any combination thereof. The first wear plate 18 may be sized and shaped such that it covers the entire area where the actuator lever 14 typically engages in metal-to-metal contact with the mounting bracket 12. Similarly, the second wear plate 22 may be sized and shaped such that it covers the entire area where the cover 24 typically engages in metal-to-metal contact with the mounting bracket 12.

The cover 24 may be affixed to the actuator lever 14 by the pawl pivot pin or rivet 30 (see FIG. 4), although other attachment mechanisms may optionally be used. In one embodiment, the pawl rivet 30 extends through the cover 24, the pawl 28, and the actuator lever 14. A cable cover 23 is attached to the cover 24 by a cable cover rivet 25 at an upper portion 27 of the cable cover 23. A hole in the upper portion 27 of the cable cover 23 is constructed and arranged to receive the main rivet 46 such that the cable cover 23 can be pivoted along with the cover 24 and the actuator lever 14 when the actuator lever 14 is moved between the applied and released positions. The cable cover 23 and the cover 24 are constructed and arranged such that when they are connected by the cable cover rivet 25, a gap 49 (see FIG. 2) is provided between the cable cover 23 and the cover 24. Holes are provided on a lower portion 29 of the cable cover 23. An output member, which takes the form of a threaded rod 52 in this embodiment, is provided between the cable cover 23 and the cover 24 at the lower portion 29 of the cable cover 23, in the gap 49. On one end, the threaded rod 52 may comprise an eyelet 43 constructed and arranged to receive a threaded rod rivet 51, which is used to attach the threaded rod 52 to the cable cover 23 and the cover 24. A bushing 54 may be provided between the threaded rod rivet 51 and the threaded rod 52 at the eyelet 51 so as to reduce the wear between the threaded rod rivet 51 and the threaded rod 52 and to constrict and restrain the lateral movement of the threaded rod rivet 51. The other end of the threaded rod 52, opposite the eyelet 51, may be attached to an equalizer 56 by a bolt 58, or other attachment mechanisms. The equalizer 56 functions to distribute tension equally to cables 20 (see FIG. 7), which will be described in more detail later.

The cover 24 engages pivot point 44 and moves along with actuator lever 14. The cover 24 may be pivotally attached to the mounting bracket 12 by the rivet 46. The cover 24 may be regarded as part of actuator lever 14, and is attached to the main portion of actuator lever 14 where tie rod 32 is carried. In some embodiments, a cam may optionally be used for coupling the cable to the lever, and the invention is not limited to the illustrated construction. For example, the brake actuator 10 may have a cam construction as described in U.S. patent application Ser. No. 11/349,186, hereby incorporated by reference in its entirety.

The vertical sections 36 of mounting bracket 12 is configured to receive sector 34. Alternatively, vertical section 36 of mounting bracket 12 and sector 34 can be one piece. Sector 34 is provided with a plurality of teeth 35 on its edge to engage pawl 28. The teeth 35 on sector 34 are directionally disposed so that pawl 28 and the actuator lever 14 may travel in a ratcheting action in only the applying direction with the pawl 28 ratcheting over the teeth 35 of sector 34. When the user wishes to move the actuator lever 14 in the releasing direction from an applied position, button 26 must be depressed. Actuator lever 14 is configured to receive button 26 at one end, with a spring 62 disposed between the button 26 and the spring shoulders 65. The spring 62 is provided to bias the button 26 in an outward direction.

Button 26 is connected to one end of tie rod 32, which is contained within actuator lever 14, and which is connected at the other end to pawl 28. A portion 17 of the tie rod 32 may be inserted into a hole 19 at the pawl 28 to connect the tie rod with the pawl 28. When button 26 is depressed, spring 62 is compressed and this motion is translated to pawl 28 by tie rod 32. Pawl 28 is pivots about pawl rivet 30 at pivot point 15, causing pawl 28 and the teeth of sector 34 to disengage sufficiently to allow travel of the actuator lever 14 in either direction. One or more springs may be provided to bias the pawl 28 into engagement with the gear teeth 35, and as the lever 14 is pivoted upwardly in a brake applying direction, the pawl 28 will ratchet over those teeth 35 and then maintain the lever 14 at the selected position. Thereafter, the lever 14 may be released by pushing the button 26 inwardly against the bias of spring 62 to move the tie rod 32 to disengage the pawl 28 from the teeth 35, and thus allow for the return of the lever 14 in the brake releasing direction to the applied direction. Other structures for releasing the pawl, and other position control devices besides a pawl, may be used. The invention is not limited to the construction illustrated in this respect.

The brake actuator 10 may also include a sensor 60 configured to sense the position of the actuator lever 14. The sensor 60 will be described in more detail later.

Figure 2:
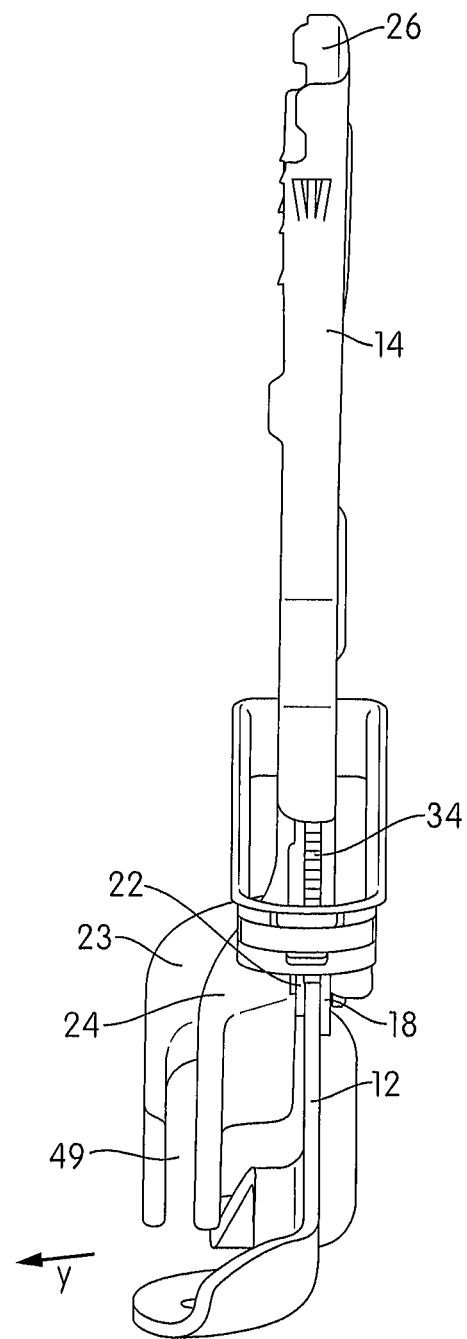
FIG. 2 is a rear view of the brake actuator in the applied position.

FIG. 2 illustrates a rear view of the brake actuator 10 in the applied or engaged position. In this position, sufficient tension is applied to cable 20 to engage the brake mechanisms 66. When the lever 14 is moved to the engaged position from the released position, the first wear plate 18 and the second wear plate 22 move along with the lever 14 and the cover 24, respectively, relative to the mounting bracket 12. The first wear plate 18 thus functions to prevent direct contact between the actuator lever 14 and the mounting bracket 12 around the pivot point 44. Similarly, the second wear plate 22 functions to prevent direct contact between the cover 24 and the mounting bracket 12 around the pivot point 44. As such, the first wear plate 18 and the second wear plate 22 effectively reduces wear on the actuator lever 14, the cover 24, and the mounting bracket 12 that typically results from direct contact between the a) actuator lever 14 and the mounting bracket 12 and b) the cover 24 and the mounting bracket 12 when the actuator lever 14 is moved between the released and engaged positions.

Figure 3:
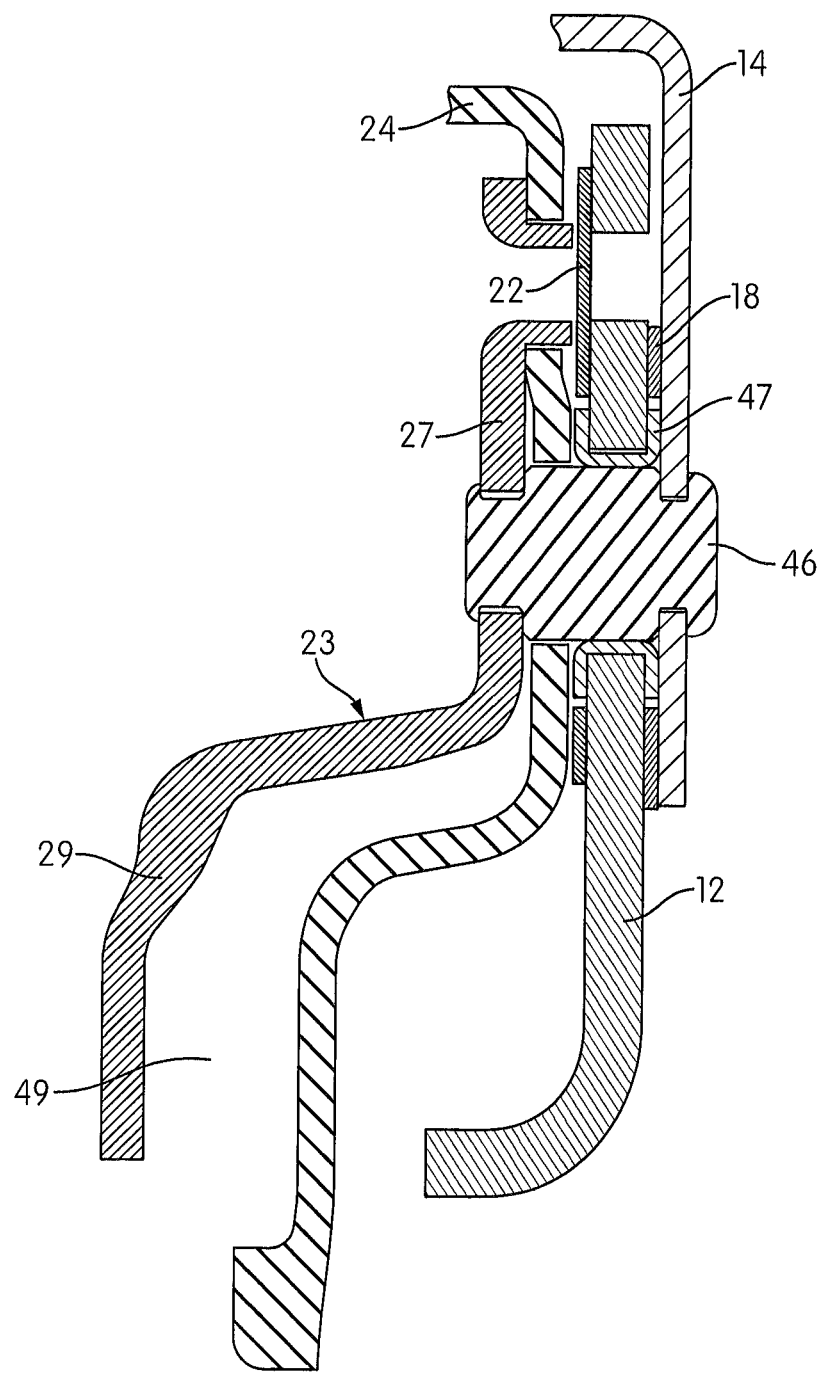
FIG. 3 is a cross sectional rear view of the brake actuator.

FIG. 3 shows a rear cross sectional view of the brake actuator 10. In this embodiment, the main rivet 46 pivotally attaches the cam cover 23, the cover 24, the mounting bracket 12, and the actuator lever 14. The first wear plate 18 is provided between the actuator lever 14 and the mounting bracket 12. The second wear plate 22 is provided between the mounting bracket 12 and the cover 24. The bushing 47 is provided between the rivet 46 and the mounting bracket 12, between the rivet 46 and the first wear plate 18, and between the rivet 46 and the second wear plate 22. The size and shape of the first wear plates 18 and second wear plates 22 may optionally vary, and the illustrated embodiment is not intended to be limiting.

Figure 4:
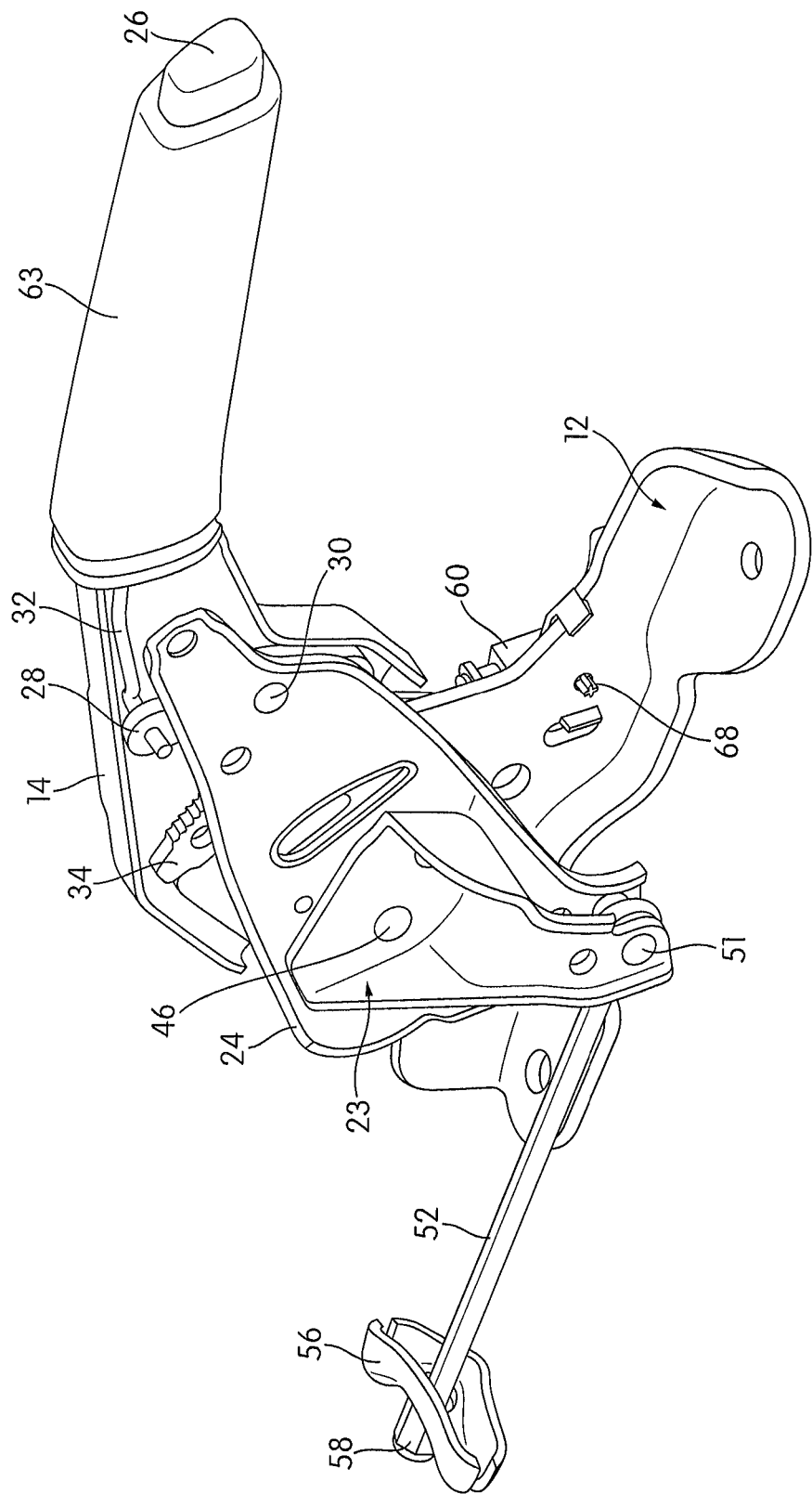
FIG. 4 is a side perspective view of the brake actuator in the released position.

FIG. 4 shows a side perspective view of the brake actuator 10. In contrast with brake actuators in which cables 20 are secured around a cam, the brake actuator 10 shown in this embodiment has the threaded rod 52 secured to the cover 24 and the cam cover 23 using the threaded rod rivet 51. This threaded rod 52 is spaced, or offset, from the actuator lever 14 in the Y direction (see FIG. 2) and extends towards the front of the motor vehicle 64. As such, this requires the brake actuator 10 to transfer the input load applied by an operator (e.g., a driver) to an offset output load through the threaded rod 52. Because of the aforementioned configuration, a moment is applied to the lever 14 and the cover 24 when load is applied by the tension created in the cable system 40 when the lever 14 is moved to an engaged position. That is, this moment results from the point at which cable system 59 (see FIG. 7) connects to the mechanical components of the brake actuator 10 (i.e., the point where rod 52 couples to pin or rivet 51) being offset in the Y direction from the pivotal connection of the lever 14. As a result of this moment, there may be increased wear on the mounting bracket 12, the cover 24, and the actuator lever 14. This may result in a larger loss of efficiency, as the friction creating the wear also resists movement of the lever 14, thus requiring the operator to apply more force to the lever to increase the cable tension a given amount.

Thus, to reduce wear or friction, the first wear plate 18 and the second wear plate 22 are provided between a) the actuator lever 24 and the mounting bracket 12 and b) the mounting bracket 12 and the cover 24, respectively. In addition to reducing wear/friction, the first wear plate 18 and the second wear plate 22 may provide lateral stability by restricting the lateral movement of the actuator lever 14 and the cover 24 relative to the mounting bracket 12. As such, the first wear plate 18 and the second wear plate 22 effects the smooth operation of the brake actuator 10. In some embodiments, the efficiency may be increased by, just for example, 10%, 15%, 20%, 30%, or more.

The decrease or elimination of wear on the mounting bracket 12, the cover 24, and the actuating lever 14 may increase efficiency, but may also increase the load applied to the threaded rod rivet 51. In some embodiments, the threaded rod rivet 51 may be heat treated so that it can support the extra load carried by the threaded rod rivet 51. The rivet 46 may also optionally be heat treated. One or both of the bushings 54 and 47 may optionally be coated with polytetrafluoroethylene, such as Teflon®, although other materials may be used to provide smooth operation.

Figure 5:
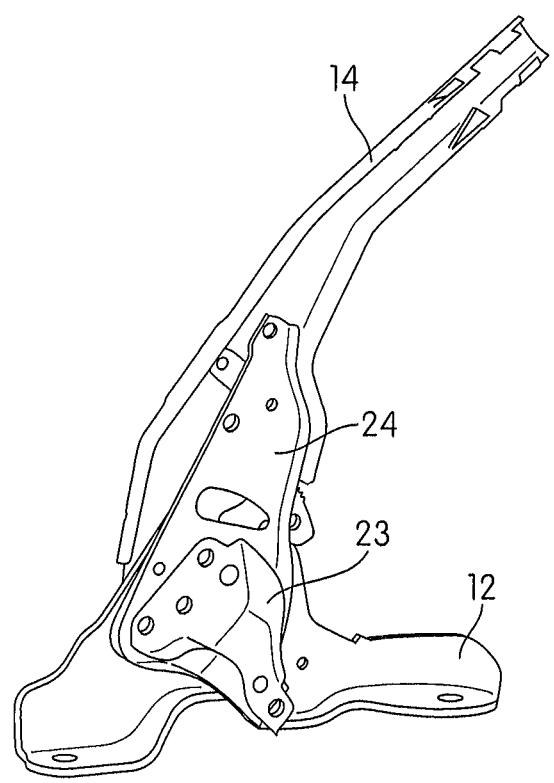
FIG. 5 is a side perspective view of the brake actuator in the applied position.

FIG. 5 shows a side perspective view of the brake actuator 10 in the applied position. As mentioned above, to move the actuator lever 14 to the applied position, the operator pulls on the actuator lever 14 in the counterclockwise direction so that the pawl 28 and the actuator lever 14 may travel in a ratcheting action in the applying direction with the pawl 28 ratcheting the teeth 35 of sector 34. The teeth 35 of the sector 34 engages the pawl 28 and prevents the actuator lever 14 from moving back towards the released position. When the actuator lever 14 is pivoted in the upwards direction, the cover 24 and the cable cover 23 pivot along with the actuator lever 14. The pivoting of the cable cover 23 and the cover 24 causes the threaded rod 52 to be pulled in a direction towards the front of the motor vehicle 64. The threaded rod 52 is attached to the equalizer 56, and the cables 20 are attached thereto. The movement of the threaded rod 52 and the equalizer 56 causes the cables 20 to be pulled, thus actuating the brake mechanism 66.

Figure 6:
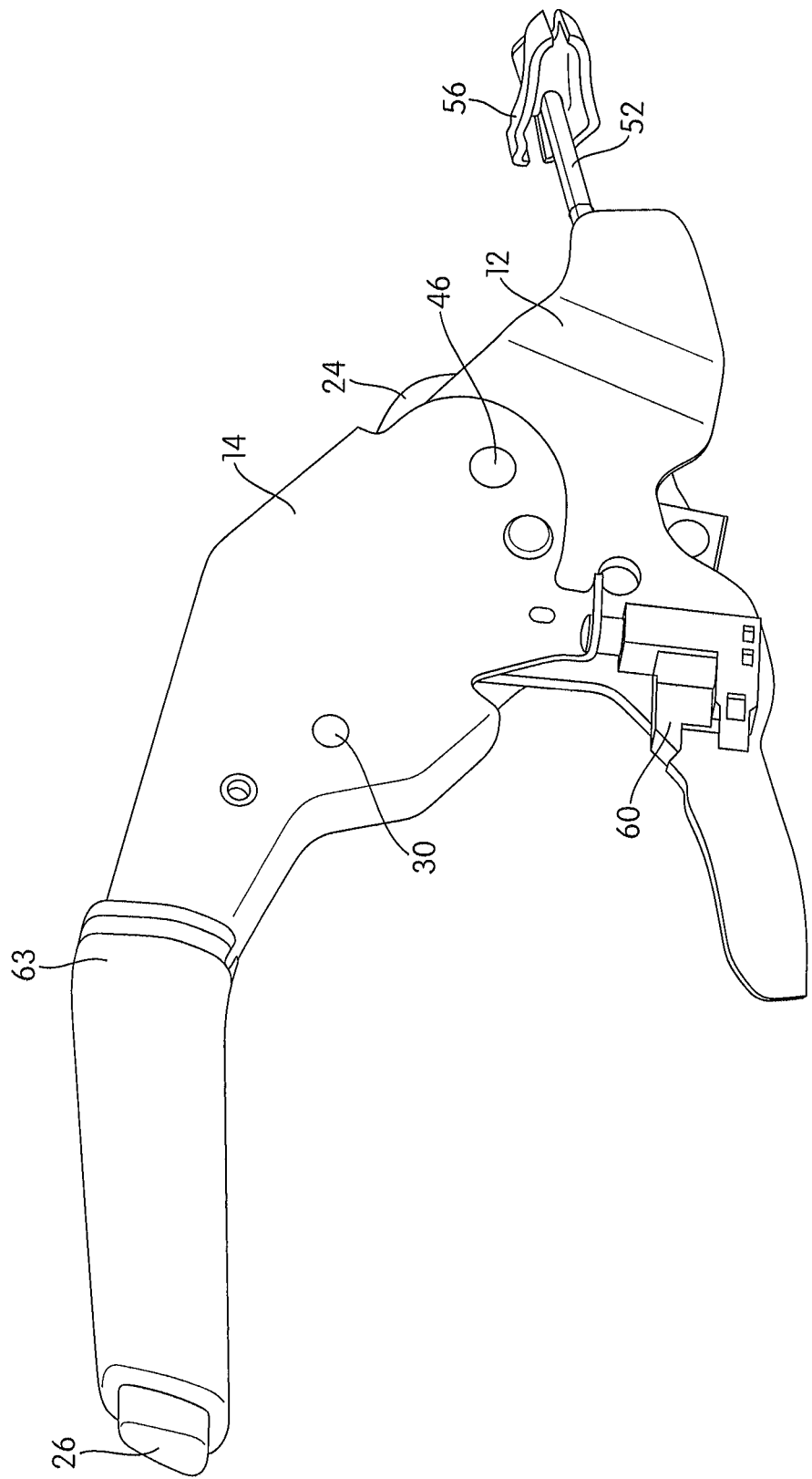
FIG. 6 is a side perspective view of the brake actuator in the released position.

FIG. 6 shows a side perspective view of the brake actuator 10 in the released position. In this embodiment, the sensor 60 is a contact switch, although other types of sensors may optionally be used. The sensor 60 is mounted on the mounting bracket 12. In one embodiment, the sensor 60 is attached to the vertical side section 36 of the mounting bracket 12 using a snap structure 68. The hole in the vertical side section 36 of the mounting bracket 12 may be of a polygonal shape that matches the shape of the snap structure 68. Thus, when snap structure 68 is disposed therein, the sensor 60 will not rotate in the hole. The sensor 60 is actuated when the actuator lever 14 is in its release position and transmits a signal indicating that the brake is released. Alternatively, the sensor 60 may be actuated when the actuator lever 14 is in its applied position and transmits a signal indicating that the brake is applied.

To release the brake mechanism 66, the actuator lever 14 may be lowered to the release position by depressing the button 26. As mentioned above, when the button 26 is depressed, the spring 62 is compressed and this motion is translated to pawl 28 by tie rod 32. Pawl 28 is pivoted about pawl rivet 30, causing pawl 28 and the teeth of sector 34 to disengage sufficiently to allow travel of the actuator lever 14 in either direction. When the actuator lever 14 is pivoted to the release position, the actuator lever 14 actuates the sensor 60 so that the sensor 60 transmits a signal indicating that the brake is applied. The movement of the cover 24 and the cable cover 23 along with the actuator lever 14 to the release position pushes the threaded rod 52 towards the front of the motor vehicle 64. The equalizer 56, to which the threaded rod 52 and the cables 20 are attached, also move towards the front of the vehicle 64, thus effectively releasing or de-actuating the brake mechanism 66.

FIG. 7 is a schematic of a motor vehicle 64, showing brake actuator 10, cable 20, and brake mechanism 66. As shown in this Figure, the brake actuating system 12 includes a cable system 59 that is operatively connected to the brake mechanism 66 such that increasing tension in the cable system 59 actuates the brake mechanism 66, and then decreasing tension in the cable system 59 de-actuates the brake mechanism 66. The cable system includes a plurality of flexible cables slideably received in flexible conduits. Typically, these cables are nylon coated steel and are connected to the equalizer 56. These cables may include a pair of relatively longer cables 20 that are connected between the equalizer 56 and the vehicle brake mechanism 66. These connections enable movement of the actuator lever 14 of the actuator 10 in the brake applying and releasing directions to increase and decrease the tension in the cable system 59. As noted above, the equalizer 56 functions to distribute tension equally to the cables 20. However, any other suitable output side connector member may be provided to operatively connect the threaded rod 52 to the remainder of the cable system 59. The cable system 12 may have any suitable layout and the illustrated embodiment is not intended to be limiting. The point for attachment of the cable system 59 to the mechanical components of the actuator 10 may be provided by any suitable structure, and the example herein is not limiting.

For most systems, the cables are nylon-coated steel strands that are slideably received in flexible conduits. These cable/conduit constructions are commonly referred to as Bowden cables and are well known in the art. Also, the flexibility of such cable/conduit constructions allows them to be routed in curved paths, which is especially useful in a vehicle where many components are arranged compactly together, and the cable/conduits constructions can be routed around these various components as needed.

In some embodiments, all or any combination of the actuator lever 14, the mounting bracket, the cover 24, the cam cover 23, and other parts of the brake actuator 10 may be stamped from one piece of sheet metal, which is preferably but not necessarily heat treated steel.

Although a handbrake has been described and shown, the use of footbrakes (i.e., a pedal-based, foot-operated actuator) in the industry is well known. Accordingly, the first wear plate 18 and/or the second wear plate 22 may also be used in a similar fashion in a footbrake. The specific details of a footbrake need not be detailed herein. Reference may be made to U.S. Pat. No. 6,397,468 as an example of such a device. This reference is incorporated in the present application in its entirety by reference. Likewise, the handbrake embodiments of the invention are not limited to the specific construction illustrated. Reference for other suitable construction may be made to U.S. Pat. Nos. 6,718,836, 6,286,389, and 6,202,980, each of which is incorporated herein in its entirety. The first wear plates 18 and/or the second wear plates 22 may optionally be used with a powered actuator that uses mechanical or electrical power from the motor vehicle 64 for operation.

The first wear plates 18 and the second wear plates 22 are not limited to be used with only the brake actuators 10 depicted, and may be used with any suitable brake actuators 10. For example, the first wear plate 18 and/or the second wear plate 22 may be used in brake actuators 10 wherein the cables 20 are secured around a cam. One or both, or any combination or numbers of first wear plates 18 and second wear plates 22 may be used. The first wear plate 18 and the second wear plates 22 may also optionally be provided between other components of the brake actuator 10, and are not limited to be used between the mounting bracket 12 and the actuator lever 14 and between the mounting bracket 12 and the cover 24.

The foregoing illustrated embodiment has been provided solely for the purpose of illustrating the structural and functional principles of the present invention, and it is not intended to be limiting. To the contrary, the present invention is intended to encompass all variables, modifications, alterations, substitutions, and equivalents within the spirit and scope of the following claims.

What is claimed is:

1. A brake actuator for use in a motor vehicle having one or more vehicle brakes actuable by a cable system with one or more cables, comprising:
   a mounting bracket;
   an output member constructed to be operatively connected to the one or more cables;
   an input lever movably mounted to the mounting bracket at a pivot point for movement in brake applying and brake releasing directions, the pivot point of the input lever being spaced axially from the output member, the input lever being operatively connected to the output member to effect movement of the output member;
   a plate provided between the mounting bracket and the input lever, the plate being constructed to prevent direct contact between the mounting bracket and the input lever during movement between the brake applying and brake releasing directions; and
   a cover portion operatively connected to the input lever with the mounting bracket disposed between the input lever and the cover portion, wherein the cover portion is constructed and arranged to move with the input lever when the lever is moved between the brake applying and brake releasing positions.

2. The brake actuator of claim 1, wherein the plate is attached to the input lever to enable movement of the plate with the input lever.

3. The brake actuator of claim 1, further comprising an additional plate provided between the mounting bracket and the cover portion, wherein the additional plate is constructed and arranged to prevent direct contact between the mounting bracket and the cover portion during movement between the brake applying and brake releasing directions.

4. The brake actuator of claim 3, wherein the additional plate is attached to the cover portion to enable movement of the additional plate with the cover portion.

5. The brake actuator of claim 3, wherein the additional plate comprises plastic material.

6. The brake actuator of claim 1, wherein the output member comprises a threaded rod operatively connected to an equalizer, the equalizer being configured to distribute tension to the one or more cables.

7. The brake actuator of claim 1, wherein the plate comprises plastic material.

8. A motor vehicle comprising:
one or more vehicle brakes;
a cable system comprising one or more cables for actuating the one or more vehicle brakes;
a mounting bracket;
an output member constructed to be operatively connected to the one or more cables;
an input lever movably mounted to the mounting bracket at a pivot point for movement in brake applying and brake releasing directions, the pivot point of the input lever being spaced axially from the output member, the input lever being operatively connected to the output member to effect movement of the output member;
a plate provided between the mounting bracket and the input lever, the plate being constructed to prevent direct contact between the mounting bracket and the input lever during movement between the brake applying and brake releasing directions; and
a cover portion operatively connected to the input lever with the mounting bracket disposed between the input lever and the cover portion, wherein the cover portion is constructed and arranged to move with the input lever when the lever is moved between the brake applying and brake releasing positions.

9. The motor vehicle of claim 8, wherein the plate is attached to the input lever to enable movement of the plate with the input lever.

10. The motor vehicle of claim 8, further comprising an additional plate provided between the mounting bracket and the cover portion, wherein the additional plate is constructed and arranged to prevent direct contact between the mounting bracket and the cover portion during movement between the brake applying and brake releasing directions.

11. The motor vehicle of claim 10, wherein the additional plate is attached to the cover portion to enable movement of the additional plate with the cover portion.

12. The motor vehicle of claim 10, wherein the additional plate comprises plastic material.

13. The motor vehicle of claim 8, wherein the output member comprises a threaded rod operatively connected to an equalizer, the equalizer being configured to distribute tension equally to the one or more cables.

14. The motor vehicle of claim 8, wherein the plate comprises plastic material.

15. A brake actuator for use in a motor vehicle having one or more vehicle brakes actuable by a cable system with one or more cables, comprising:
a mounting bracket;
an output member constructed to be operatively connected to the one or more cables;
an input lever movably mounted to the mounting bracket at a pivot point for movement in brake applying and brake releasing directions, the pivot point of the input lever being spaced axially from the output member, the input lever being operatively connected to the output member to effect movement of the output member;
a cover portion operatively connected to the input lever with the mounting bracket disposed between the input lever and the cover portion, wherein the cover portion is constructed and arranged to move with the input lever when the lever is moved between the brake applying and brake releasing positions; and
a plate provided between the mounting bracket and the cover portion, wherein the plate is constructed and arranged to prevent direct contact between the mounting bracket and the cover portion during movement between the brake applying and brake releasing directions, and an additional plate provided between the mounting bracket and the input lever, the additional plate being constructed to prevent direct contact between the mounting bracket and the input lever during movement between the brake applying and brake releasing directions.

16. The brake actuator of claim 15, wherein the additional plate is attached to the input lever to enable movement of the additional plate with the input lever.

17. The brake actuator of claim 15, wherein the plate is attached to the cover portion to enable movement of the plate with the cover portion.

* * * * *